United States Patent
Kubo et al.

(10) Patent No.: US 7,442,139 B2
(45) Date of Patent: *Oct. 28, 2008

(54) CONVEYANCE SYSTEM

(75) Inventors: Aizoh Kubo, Kyoto (JP); Hiroki Ishida, Osaka (JP); Masatoshi Sonoda, Osaka (JP)

(73) Assignee: Tsubakimoto Chain Co., Osaka (JP), (part interest)

(*) Notice: Subject to any disclaimer, the term of this patent is extended or adjusted under 35 U.S.C. 154(b) by 374 days.

This patent is subject to a terminal disclaimer.

(21) Appl. No.: 11/247,625

(22) Filed: Oct. 11, 2005

(65) Prior Publication Data
US 2006/0084542 A1    Apr. 20, 2006

(30) Foreign Application Priority Data
Oct. 18, 2004    (JP)    ............... 2004-302799

(51) Int. Cl.
*F16H 55/30*    (2006.01)
*F16G 1/28*    (2006.01)
*F16G 5/20*    (2006.01)

(52) U.S. Cl. ............... 474/152; 474/154; 474/155; 474/156; 474/160; 474/202; 474/203; 474/206; 474/209

(58) Field of Classification Search ......... 474/151–156, 474/160, 202–203, 206, 209
See application file for complete search history.

(56) References Cited

U.S. PATENT DOCUMENTS

| | | | | |
|---|---|---|---|---|
| 2,426,998 A | * | 9/1947 | Hall | ............... 198/730 |
| 4,492,030 A | * | 1/1985 | Beerens | ............... 30/384 |
| 4,856,719 A | * | 8/1989 | Hallez | ............... 241/200 |
| 5,170,882 A | | 12/1992 | Tekathen et al. | |
| 5,362,278 A | * | 11/1994 | Bergles et al. | ............... 474/69 |
| 5,848,948 A | * | 12/1998 | Allen | ............... 474/156 |
| 6,036,614 A | | 3/2000 | Baddaria | |
| 6,375,589 B1 | * | 4/2002 | Makino et al. | ............... 474/148 |
| 2004/0002402 A1 | | 1/2004 | Nakamura | |

FOREIGN PATENT DOCUMENTS

| | | |
|---|---|---|
| EP | 1493 946 A1 | 1/2005 |
| JP | 5-231500 | 9/1993 |
| JP | 2003-165605 | 6/2003 |
| JP | 2004-036639 | 2/2004 |

OTHER PUBLICATIONS

U.S. Appl. No. 11/269,002, Aizoh Kubo et al.
U.S. Appl. No. 11/264,317, Masatoshi Sonoda.
International Standard, Part 2: Tables of standard tolerance grades and limit deviations for holes and shafts, International Organization For Standardization, ISO 286-2; First Edition Jun. 1, 1988.

* cited by examiner

*Primary Examiner*—Robert A. Siconolfi
*Assistant Examiner*—Mahbubur Rashid
(74) *Attorney, Agent, or Firm*—Howson & Howson LLP

(57) ABSTRACT

In a slat conveyor, slats for supporting conveyed articles and personnel extend between two side-by-side, spaced, endless roller chains engaged with driving sprockets at one end of the conveying path and driven sprockets at the other end. At a location radially outward from the pitch circle, the distance between the front surface of the sprocket teeth to the tooth center line is at least as great as the distance from the centerline to the front surface at the pitch circle. The tooth faces merge smoothly with the tooth gap bottom, and the root diameter is smaller than the root diameter according to ISO standards.

1 Claim, 9 Drawing Sheets

CONVEYANCE SYSTEM

CROSS-REFERENCE TO RELATED APPLICATION

This application claims priority based on Japanese patent application 2004-302799, filed Oct. 18, 2004. The entire disclosure of the Japanese patent application 2004-302799 is hereby incorporated by reference.

FIELD OF THE INVENTION

This invention relates to a conveyance system in which a conveyor includes pair of endless conveyor chains engaged with a pair of driving sprockets and a pair of driven sprockets.

BACKGROUND OF THE INVENTION

Chain conveyors are used in various applications, such as in vehicle assembly. In a conventional chain conveyor, sprockets are arranged on the left and right sides of the conveyor path, both at the front end and at the rear end of the conveyor. A first chain is engaged with the sprockets on the left side, and a second chain is engaged with the sprockets on the right side. The chains reverse their direction of travel as they pass over the sprockets at the front and rear ends of the conveyor. Slat plates, connected to the chain links, extend, transverse to the path of conveyor travel, from one chain to the other.

A typical vehicle assembly conveyor is shown and described in Japanese Laid-Open Patent Publication No. 2003-165605. In that conveyor, vehicle-supporting trays are sequentially placed on a slat conveyor, and a raised working floor, on which assembly workers ride, is formed on the conveyor, between the successive trays, by treads attached to the slat plates.

In chain conveyors such as the slat conveyor disclosed in Japanese Laid-Open Patent Publication No. 2003-165605, it is conventional for the chain pitch to be large compared to the chain pitch of a transmission chain.

United States Patent application publication No. US2004/0002402 shows and describes a typical conveyor chain. The tooth forms of a sprockets which engage with the endless conveyor chain are symmetrical, and the tooth thickness becomes progressively smaller toward the tooth head, so that the chains and the sprockets can engage smoothly without interference.

However, because of the larger chain pitch, large pulsations and speed variations of the chain are generated due to polygonal motion. These pulsations and speed variations are a problem in chain conveyors, especially in assembly lines for automobiles, electrical appliances and the like, where workers ride on the conveyor, and also in the case of escalators. In the case of an assembly line conveyor, pulsations and speed variations make assembly work difficult. Moreover, in the case of an assembly line conveyor, and in an escalator as well, the pulsations and speed variations result in an uncomfortable ride.

In the case of an escalator, a smaller chain pitch has been used in order to improve rider comfort, but the smaller chain pitch results in significantly increased costs because of the high parts count.

A general object of this invention is to solve the aforementioned problems of pulsations and speed variations.

More particularly, it is an object of the invention to provide a conveyance system in which vertical movement of the endless roller chains or bushing chains, due to polygonal motion, is reduced. It is also an object of the invention to enable the rollers of the chain (or bushings in the case of a bushing-type chain) to disengage smoothly from the sprockets. Finally, it is an object of the invention to suppress pulsations and speed variations resulting from polygonal motion, and to achieve stable conveyance of articles so that working conditions and comfort on the conveyor are improved.

SUMMARY OF THE INVENTION

The conveyance system in accordance with the invention comprises a pair of endless conveyor chains arranged in spaced, side-by-side, relationship along a conveying path having a first end and a second end. A pair of driving sprockets are respectively in meshing engagement with the chains at the first end of the conveying path, and rotatable in a direction to drive the chains in a first direction along the conveying path. A pair of driven sprockets are respectively in meshing engagement with the chains at the second end of the conveying path, and rotatable by the chains. The chains may be either roller chains having rollers as sprocket-engaging members, or bushing chains having bushings as sprocket-engaging members.

Each of the sprockets has a plurality of teeth, with tooth gaps between successive teeth. The successive teeth of each sprocket have facing tooth surfaces which are continuous with, and connected to each other by a tooth gap bottom. The sprocket engaging members of each of the chains are engageable with the tooth gap bottoms in the tooth gaps of its respective driving and driven sprockets. The tooth form of each tooth of each of the sprockets has a portion at which the distance from the center line of the tooth to at least the front tooth surface in the rotational direction of the sprocket, at a location radially outward from the pitch circle, is larger than or equal to the distance from the center line at the location of the pitch circle to the intersection of the pitch circle and the front tooth surface.

In a preferred embodiment, the root diameter of each of the driving and driven sprockets is smaller than the root diameter of a sprocket having an ISO tooth form.

With the sprocket teeth formed so the distance from the tooth center line to the front tooth surface at a location radially outward from the pitch circle is at least as great as the distance from the center line to the front tooth surface at the pitch circle, vertical movement of the chain resulting from polygonal motion is reduced, and pulsations and speed variations due to the polygonal motion are suppressed so that articles can be conveyed in a stable manner, work can be carried out more effectively on the conveyed articles, and riding comfort is improved.

Where the root diameter of the sprockets is smaller than the root diameter in a sprocket following the ISO tooth form standards, the rollers or bushings of the chain can be smoothly disengaged from the sprockets.

DETAILED DESCRIPTION OF THE PREFERRED EMBODIMENTS

Figure 1:
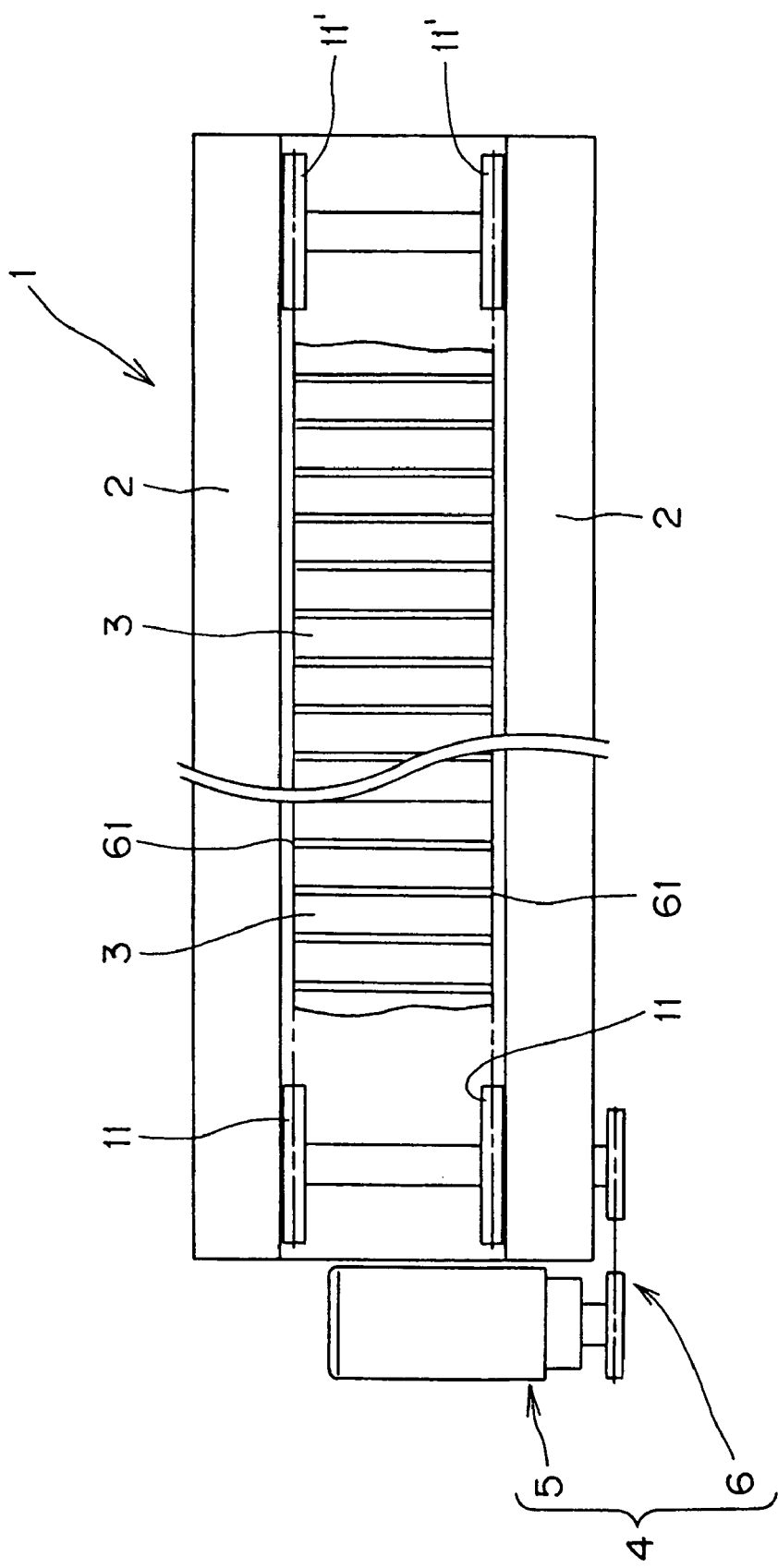
FIG. 1 is a schematic plan view of a slat conveyor according the invention.
Figure 2:
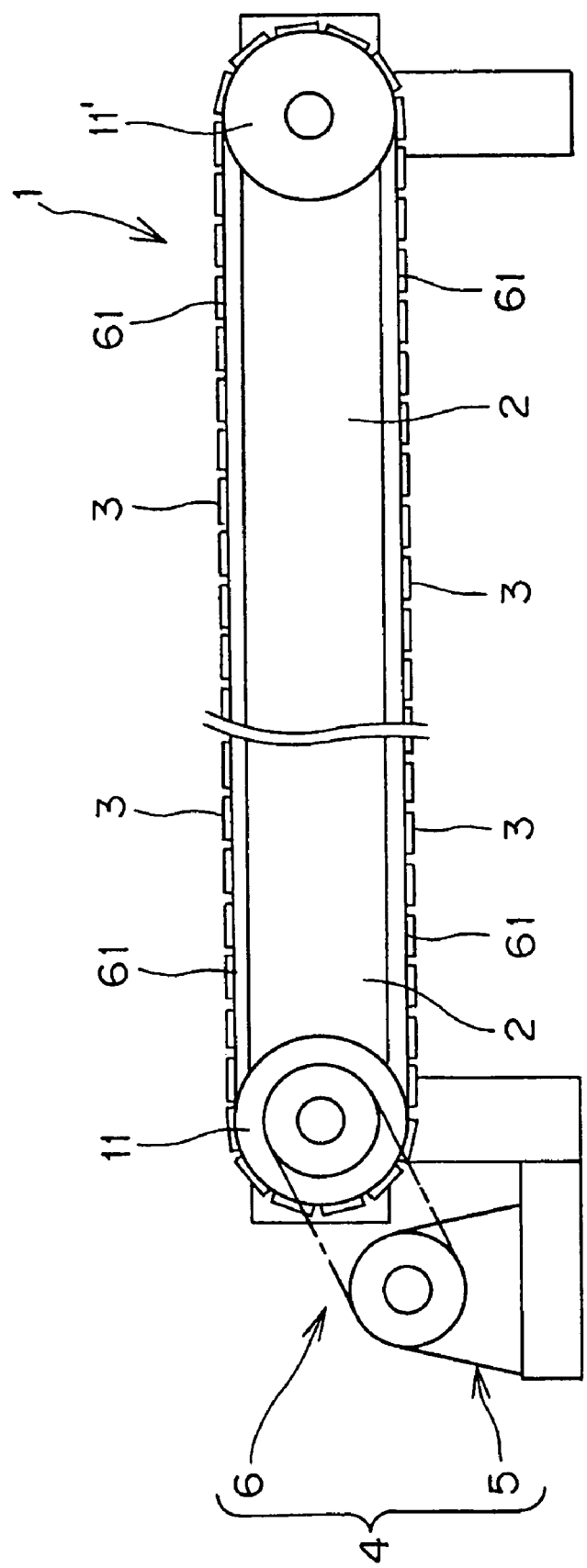
FIG. 2 is a schematic side elevational view of the slat conveyor of FIG. 1.

FIGS. 1 and 2 show the best mode of a conveyance system according to the invention. The conveyance system comprises a slat conveyor 1, including a pair of endless conveyor chains 61 in side-by-side, spaced relationship, and in driving engagement with a pair of driving sprockets 11 and a pair of driven sprockets 11'. The chains are preferably roller chains, although bushing-type chains, in which the sprocket tooth-engaging elements are bushings instead of rollers, can be used.

Figure 3:
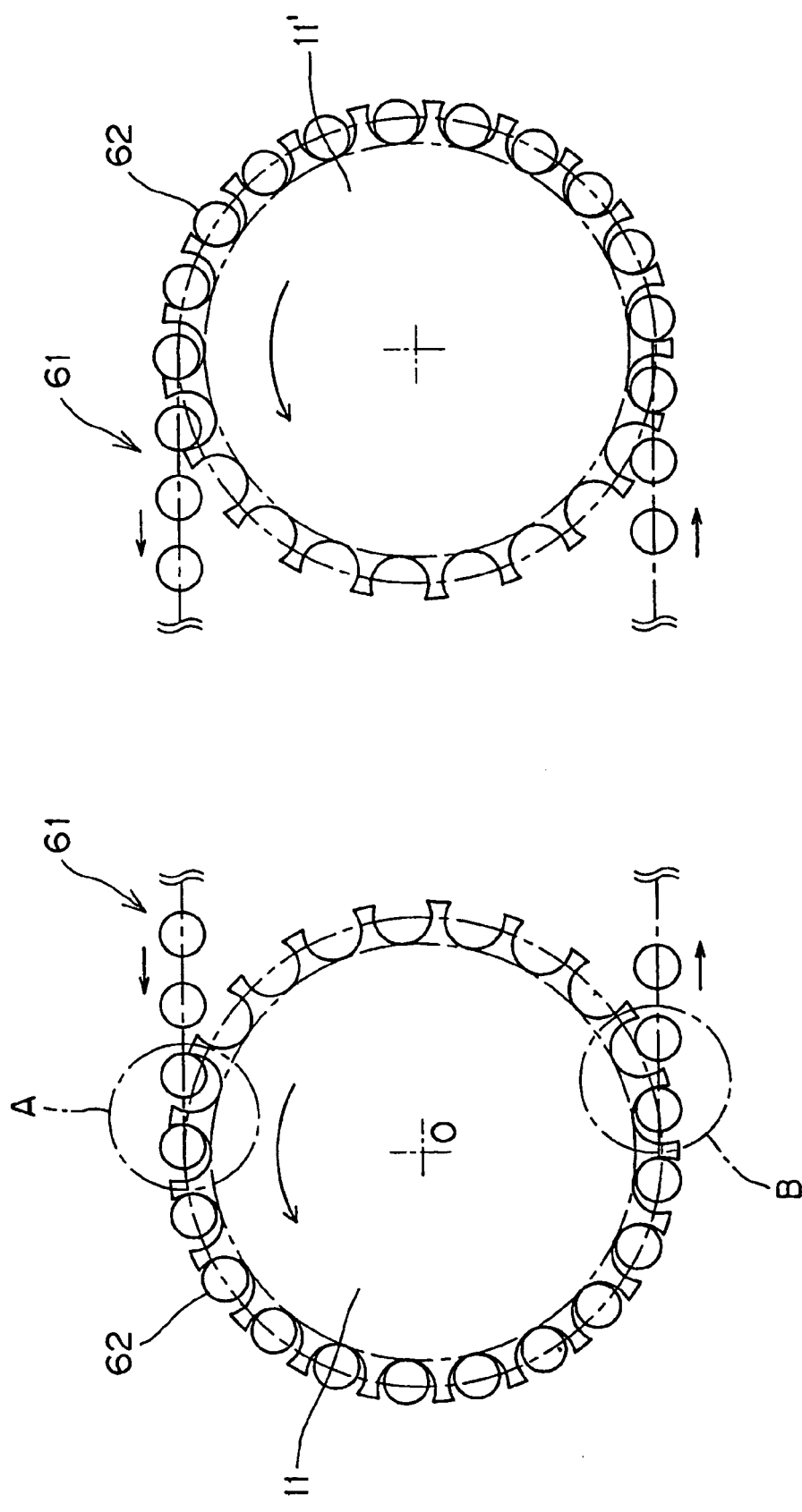
FIG. 3 is a schematic elevational view, partly broken away, showing an endless roller chain engaged with a driving sprocket and a driven sprocket in the slat conveyor shown in FIGS. 1 and 2.
Figure 4:
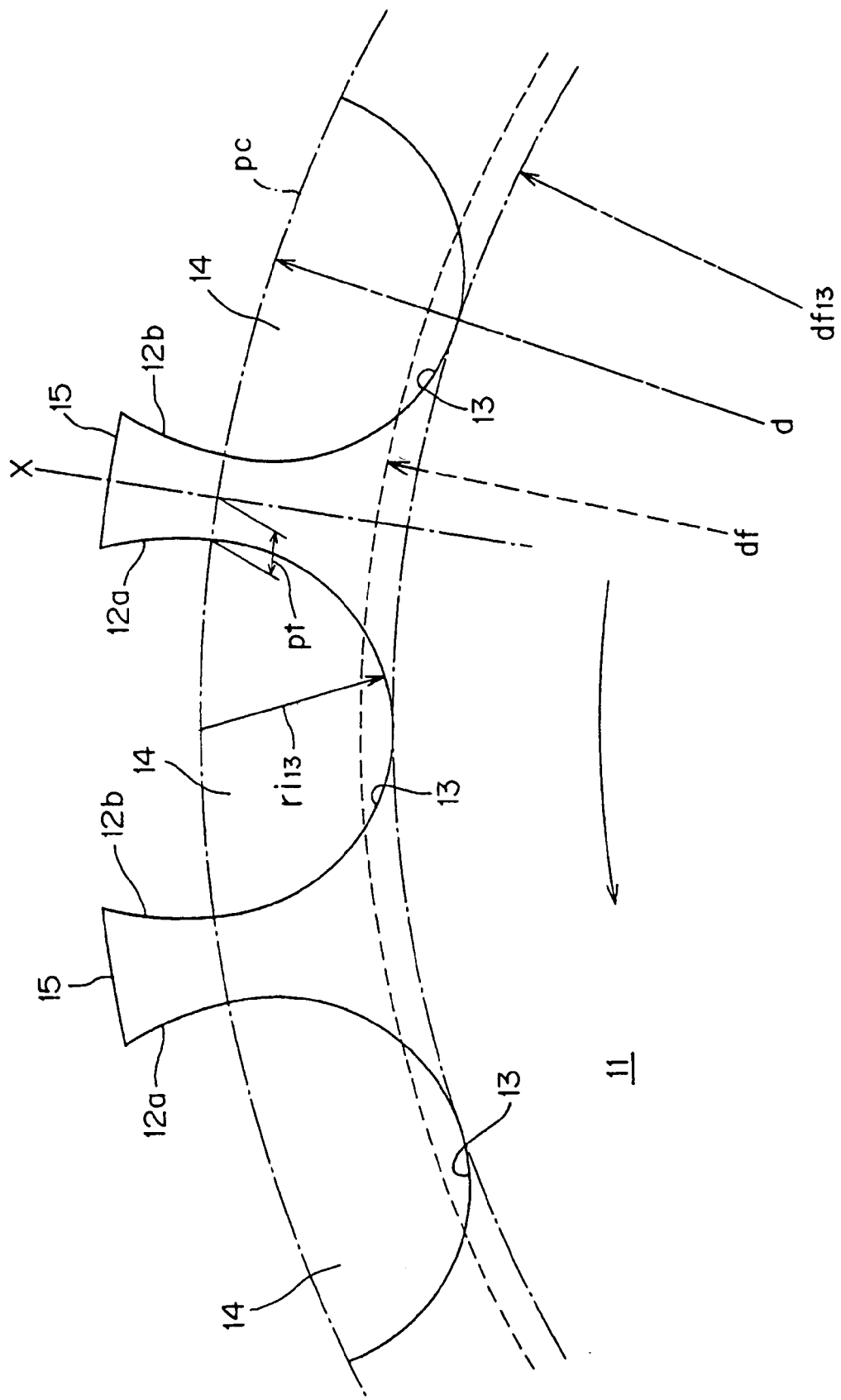
FIG. 4 is an enlarged view of the driving sprocket of FIG. 3, showing details of the sprocket tooth form.

As shown in FIG. 3, in the driving sprocket 11 and in the driven sprocket 11', a plurality of teeth 15 are formed by cutting tooth gaps 14 in the form of grooves. The facing surfaces of adjacent teeth are continuous with a gap bottom 13. As shown in FIG. 3, rollers 62 engage with the sprockets in the tooth gaps 14. In the embodiment of FIGS. 3-6, the tooth forms of the driving sprocket 11 and the driven sprocket 11' are symmetrical with respect to tooth center lines x, as shown in FIG. 4. The center line x of each tooth 15 extends radially from the rotational center O of the sprocket (see FIG. 3) and is centered with respect to the root of the tooth. As shown in FIG. 4, pt is the distance from the point at which the center line x intersects the pitch circle pc, to the point at which the pitch circle intersects the front surface 12a of the tooth (i.e., the front surface with respect to the direction of sprocket rotation, as indicated by the arrow in FIG. 4).

The sprocket tooth is characterized by the fact that it has a portion, radially outward from the pitch circle, where the distance from the center line x to the front tooth surface 12a is greater than the distance pt. In this embodiment, the distance from the center line x to the back tooth surface 12b at a location radially outward from the pitch circle is also larger than the distance pt.

The sprocket tooth form is also characterized by the fact that the root diameter $df_{13}$, that is, the diameter of the tooth bottom circle is smaller than the diameter of a tooth bottom circle having an ISO tooth form. The ISO tooth form, according to ISO Standard ISO 606:1994(E), is one in which the root diameter df, conforms with the formula df=d−d1, where d is the pitch diameter, and d1 is the roller diameter. The root diameter $df_{13}$ of a sprocket in this invention is considered to be smaller than the root diameter of a sprocket having an ISO tooth form if it is less than an amount equal to d−d1, less the maximum tolerance as prescribed ISO standards 606 and 286-2. The relevant ISO standards are set forth in the attached tables 1 and 2.

As shown in FIGS. 1 and 2, in the slat conveyor according to the invention, the driving sprockets 11 are mounted on a driving shaft rotatably supported at one end of a support frame 2, and a pair of driven sprockets 11' are attached to a driven shaft rotatably supported at the other end of the frame 2. Each of the two endless roller chains 61 is in mesh with a driving sprocket 11 and a driven sprocket 11'. The ends of slats 3 are attached to facing link plates of the respective chains, so that the slats extend from one chain to the other in a direction transverse to the direction of chain travel.

The slat conveyor is driven by a drive unit 4, comprising a combined driving motor and reduction gear 5, and a chain and sprocket transmission 6, the output sprocket of which is attached to the shaft on which conveyor driving sprockets 11 are mounted. Although a chain and sprocket transmission is preferred for driving the conveyor, any of various other suitable transmissions may be used to drive the conveyor. For example, a belt transmission, or a gear transmission may be used.

As shown in FIG. 3, the driving sprockets 11 and the driven sprockets 11' have the same tooth forms. Therefore, only the driving sprocket 11 will be described.

The sprocket 11, in accordance with a first embodiment of the invention, has a tooth form as shown in FIG. 4, each tooth 15 having opposite tooth surfaces 12a and 12b.

The teeth 15 are separated by tooth gaps 14, and the front tooth surface 12a of each tooth, and the facing back tooth surface 12b of a next tooth are continuous with the bottom of a tooth gap between the teeth.

Further, in the tooth form shown in FIG. 4, the front tooth surface 12a and the back tooth surface 12b are symmetrical with respect to the center line x of the tooth 15, which is a radial line extending from rotational center O of the sprocket 11 (see FIG. 3) and the center of the root of the tooth 15.

As seen in FIG. 4, the tooth surfaces 12a and 12b are both in the form of a concave curved surface. Moreover, the tooth bottom 13 is in the shape of an arc having a radius $ri_{13}$ centered on the pitch circle pc. The concave tooth surfaces 12a and 12b are smoothly continuous with the arcuate tooth bottom.

The distances from the center line x of the tooth 15 to the front tooth surface 12a and to the back tooth surface 12b, at locations radially outward from the pitch circle, are greater than the distance pt, which is measured from the intersection of the pitch circle with tooth center line x to the intersection of the pitch circle with the front tooth surface. As shown in FIG. 4, the root diameter $df_{13}$, that is the diameter of the tooth bottom circle, is smaller than the diameter df of the tooth bottom circle of a sprocket having an ISO tooth form. That is, the relation $df_{13}$<df is satisfied, even when ISO tolerances are taken into account. For purposes of comparison, the root diameter df in the ISO tooth form is shown by a broken line in FIG. 4.

To convey articles (not shown) placed on slats 3, the geared driving motor 5 is operated to rotate the driving sprockets 11 through the transmission 6. When the driving sprockets 11 are rotated, the endless roller chains 61 travel along the conveying path, and the slats 3, attached to the chains 61 are thereby moved in the conveying direction.

Figure 5:
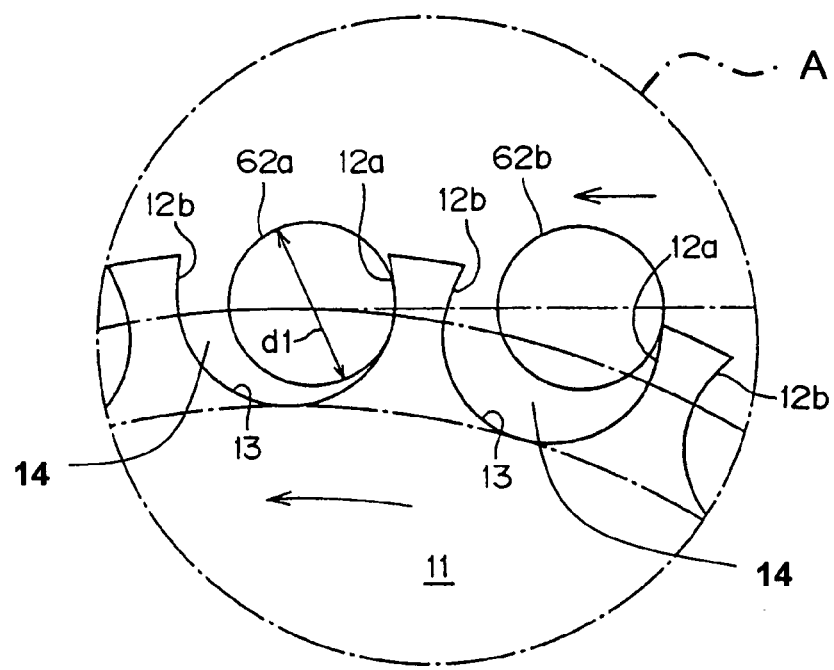
FIG. 5 is an enlarged view illustrating the engagement of the endless roller chain in FIG. 3 with the driving sprocket.
Figure 6:
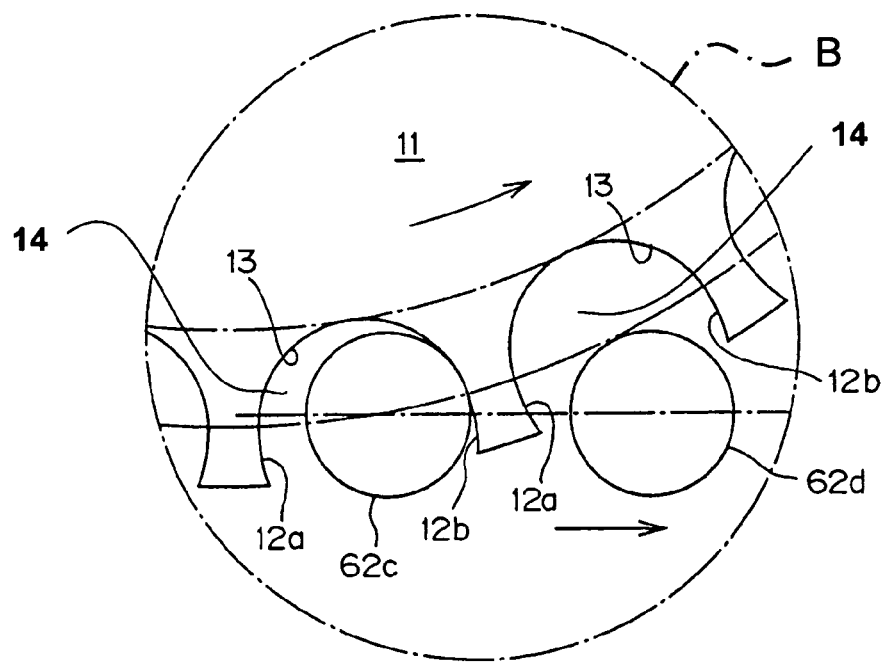
FIG. 6 is an enlarged view illustrating the disengagement of the endless roller chain in FIG. 3 from the driving sprocket.

Referring to FIGS. 3, 5 and 6, when the sprocket 11 is rotated counterclockwise as shown by arrows in FIG. 3, the rollers 62 of the roller chains 61 engage with sprockets 11 in the tooth gaps of the sprockets so that the chains are driven.

As seen in FIG. 5, at the location of engagement A, when a preceding roller 62a is fully engaged with the sprocket 11 in a tooth gap 14 in front of a tooth, the following roller 62b will already have engaged a front tooth surface 12a of a next tooth. The center of the preceding roller 62a, and the center of the following roller 62b, are both positioned on the same horizontal line. With counterclockwise rotation of the sprocket 11, the respective rollers 62 move while rolling in the tooth gaps 14. As best seen in FIG. 3, as the sprocket rotates, the roller 62 moves, within its tooth gap, from a front tooth surface 12a to a back tooth surface 12b. Moreover, as shown in FIG. 6, at a disengagement location B, when a following roller 62c is engaged with a back tooth surface 12b, the preceding roller 62d disengages from a back tooth surface 12b so that it is smoothly disengaged from the sprocket.

Since the tooth form of the teeth of sprocket 11 has a portion where the distance from the center line x to the front tooth surface 12a is greater than the distance pt, when a preceding roller 62a engages with a tooth gap 14, the subsequent roller 62b will have already engaged with a front tooth surface 12a. Therefore, vertical movement of the roller chain resulting from polygonal motion is reduced. As a result, pulsation of the chain is suppressed, and speed variations of the chain are also suppressed. Furthermore, since the pulsation and speed variations of the chain are suppressed, a reduction in noise is achieved. Tension variations are also reduced, and consequently the service life of the chain is increased.

When the root diameter $df_{13}$ is smaller than the root diameter df of an ISO tooth form, the rollers move from a front tooth surface to a back tooth surface, and smoothly disengage from the sprocket. Consequently, when the chains and sprockets are incorporated into a slat conveyor, stable conveyance of articles can be carried out, rider comfort is improved, and, as a result, work can be carried out on conveyed articles more efficiently.

Figure 7:
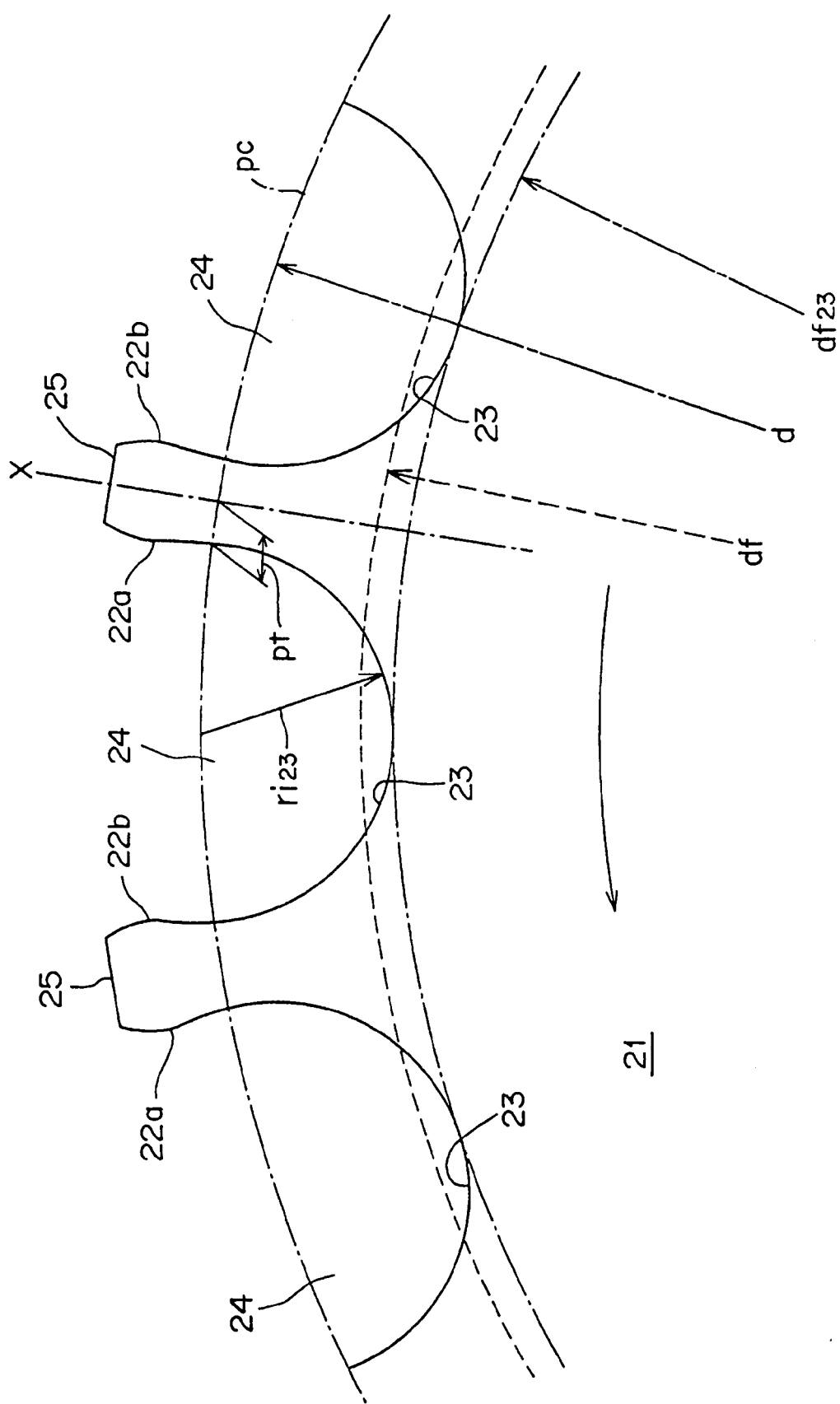
FIG. 7 is an enlarged view showing the tooth form of a driving sprocket according to a second embodiment of the invention.

In the second embodiment of a slat conveyor according to the invention, the driving and driven sprockets have the tooth configuration shown in FIG. 7. Since the driving and driven sprockets have the same tooth forms, only the driving sprocket 21 will be described.

Each tooth 25 has front and back tooth surfaces 22a and 22b respectively, and the teeth are separated by tooth gaps 24, having a tooth gap bottom 23 which is smoothly continuous with the facing front and back surfaces of adjacent teeth. The front tooth surfaces 22a and the back tooth surfaces 22b are symmetrical with respect to the center lines x of the teeth 25. The tooth surface 22a and the tooth surface 22b are each in the form of a convex curved surface. The tooth bottom 23 is arc-shaped, with a radius $ri_{23}$. The tooth surfaces 22a and 22b are smoothly continuous with the tooth bottom 23.

The distances from the center line x of the tooth 25 to the front tooth surface 22a in the rotational direction of the sprocket, and also from the center line x to the back tooth surface 22b in the rotational direction of the sprocket, at least at some locations spaced radially outward from the pitch circle, are both larger than the distance pt, measured from the intersection of the pitch circle pc with the center line x and the intersection of the pitch circle pc with the front tooth surface 22a.

As in the case of the first embodiment, the root diameter $df_{23}$ is smaller than the root diameter df of an ISO tooth form. That is, the relation $df_{23}<df$ is satisfied, taking ISO tolerances into account. The root diameter df of the ISO tooth form is shown by broken lines in FIG. 7.

The slat conveyor according to the second embodiment of the invention produces substantially the same actions and effects as those produced by slat conveyor of the first embodiment, explained above with reference to FIGS. 3, 5 and 6.

Figure 8:
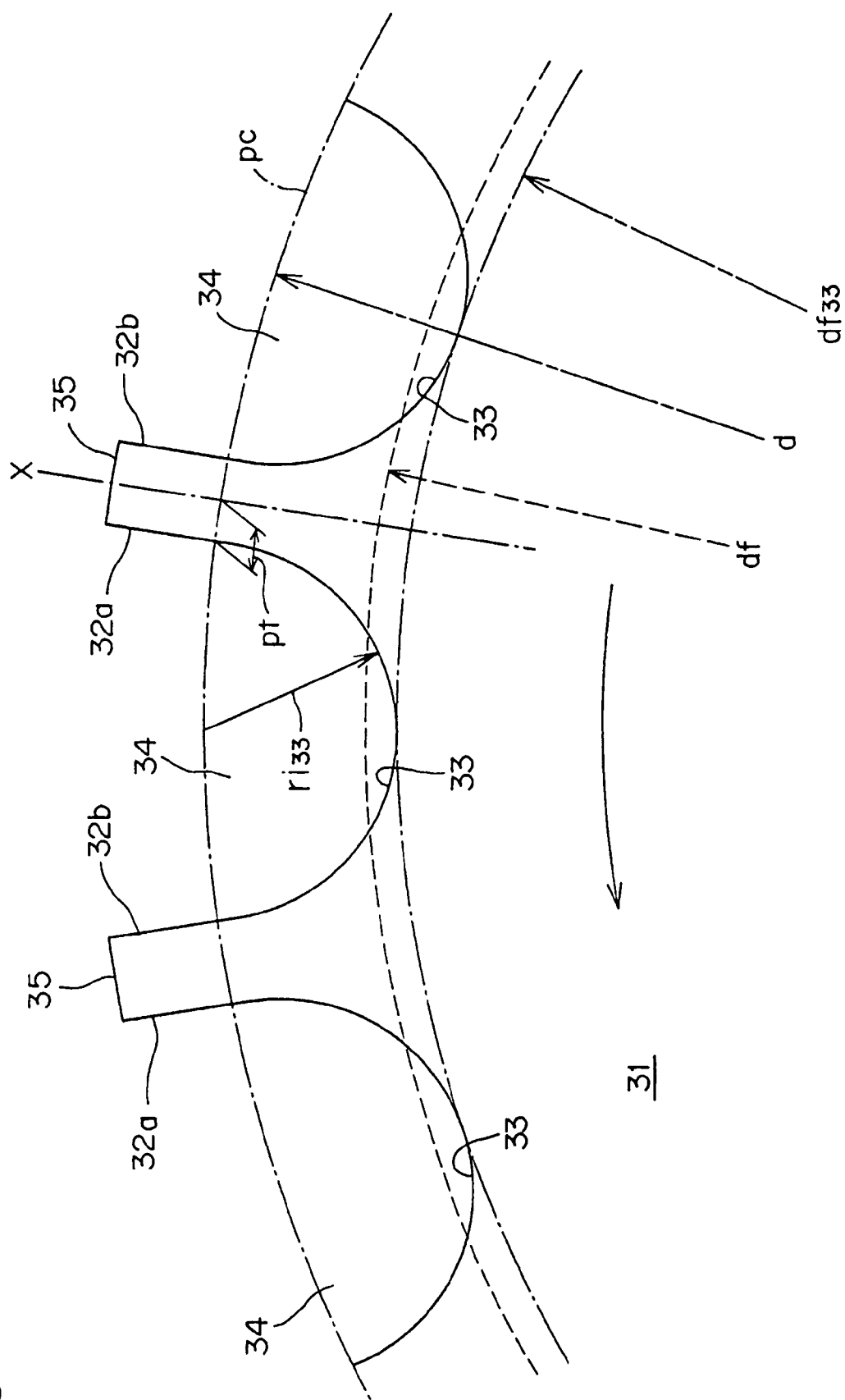
FIG. 8 is an enlarged view showing the tooth form of a driving sprocket according to a third embodiment of the invention.

In the third embodiment of a slat conveyor according to the invention, the driving and driven sprockets have the tooth forms shown in FIG. 8. Since the driving and driven sprockets have the same tooth forms, only the driving sprocket 31 will be described.

Each tooth 35 has front and back tooth surfaces 32a and 32b respectively, and the teeth are separated by tooth gaps 34, having a tooth gap bottom 33 which is smoothly continuous with the facing front and back surfaces of adjacent teeth. The front tooth surfaces 22a and the back tooth surfaces 22b are symmetrical with respect to the center lines x of the teeth 35. In this embodiment, the tooth surface 32a and the tooth surface 32b are in the form of parallel planes. The tooth bottom 33 is arc-shaped, with a radius $ri_{33}$. The tooth surfaces 32a and 32b are smoothly continuous with the tooth bottom 33.

In this embodiment, the distances from the center line x of the tooth 35 to the front tooth surface 32a, and to the back tooth surface 32b, are equal to the distance pt, measured from the intersection of the pitch circle pc with center line x to the intersection of the pitch circle with front tooth surface 32a. Moreover, as shown in FIG. 8, the root diameter $df_{33}$ is smaller than the root diameter df of the ISO tooth form. That is, the relation $df_{33}<df$ is satisfied, taking ISO tolerances into account. The root diameter df of the ISO tooth form is shown by a broken line in FIG. 8.

The slat conveyor according to the third embodiment of the invention produces substantially the same actions and effects as those produced by the slat conveyors of the first and second embodiments.

Figure 9:
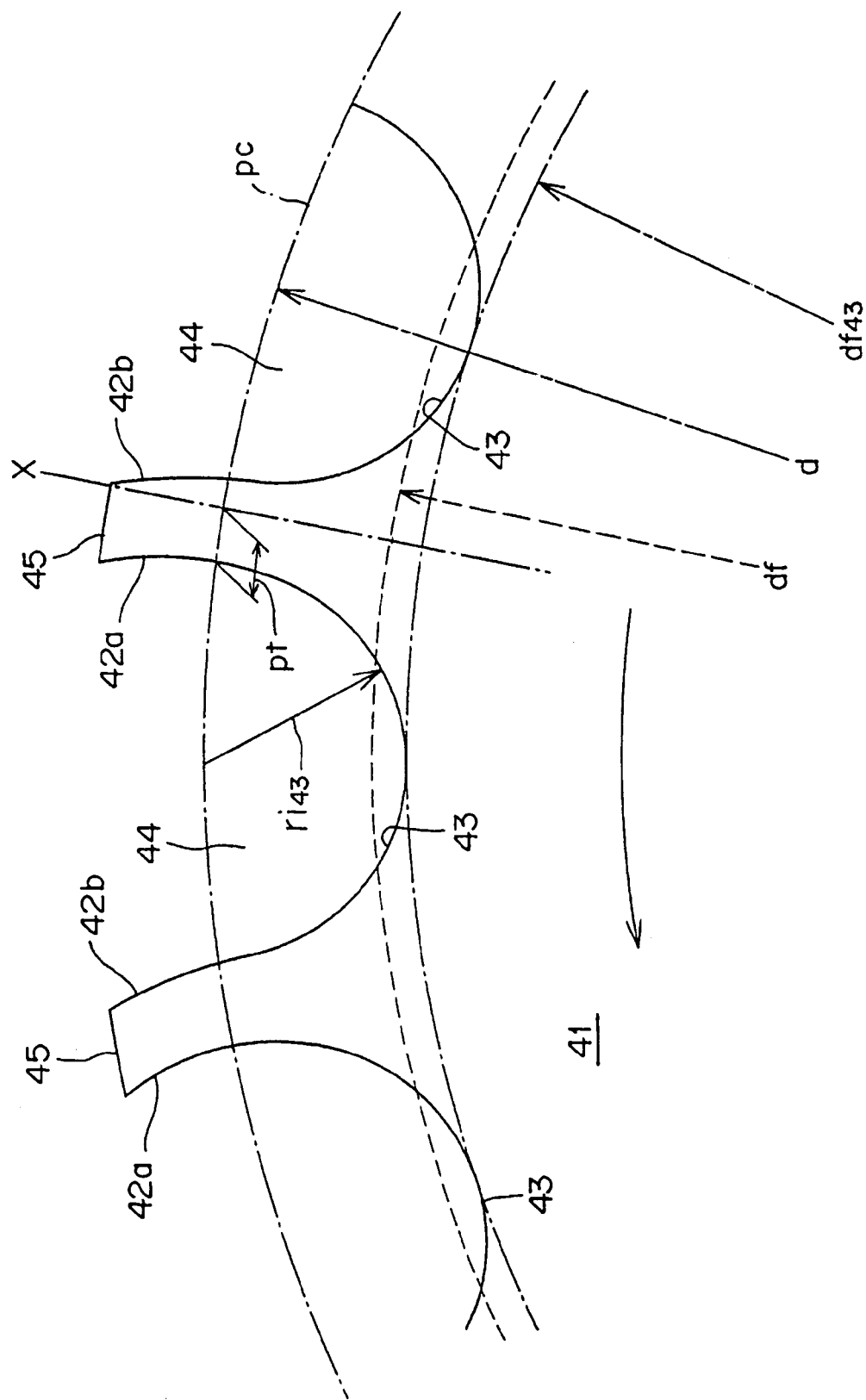
FIG. 9 is an enlarged view showing the tooth form of a driving sprocket according to a fourth embodiment of the invention.

In the fourth embodiment of a slat conveyor according to the invention, the driving and driven sprockets have the tooth forms shown in FIG. 9. Since the driving and driven sprockets have the same tooth forms, only the driving sprocket 41 will be described.

Each tooth 45 has front and back tooth surfaces 42a and 42b respectively, and the teeth are separated by tooth gaps 44, having a tooth gap bottom 43 which is smoothly continuous with the facing front and back surfaces of adjacent teeth. In this embodiment, however, the front tooth surfaces 42a and the back tooth surfaces 42b are asymmetric with respect to the center lines x of the teeth 45.

The tooth surface 42a is a substantially concave curved surface. On the other hand, the tooth surface 42b has substantially the same curvature of a tooth surface according to the ISO tooth form.

The tooth bottom 43 is arc-shaped, with a radius $ri_{43}$. The tooth surfaces 42a and 42b are smoothly continuous with the tooth bottom 43.

The distance from the center line x of the tooth 45 (which is drawn radially from the center of rotation of the sprocket through the center of the root of the tooth), to the front tooth surface 42a, in at least a portion of the tooth radially outward from the pitch circle pc, is greater than the distance pt, measured from the intersection of the pitch circle pc with the center line x to the intersection of the pitch circle with the front surface of the tooth. As shown in FIG. 9, the root diameter $df_{43}$ is smaller than the root diameter df of the ISO tooth form. That is, the relation $df_{43}<df$ is satisfied, taking ISO tolerances into account. The root diameter df of the ISO tooth form is shown by a broken line in FIG. 9.

Figure 10:
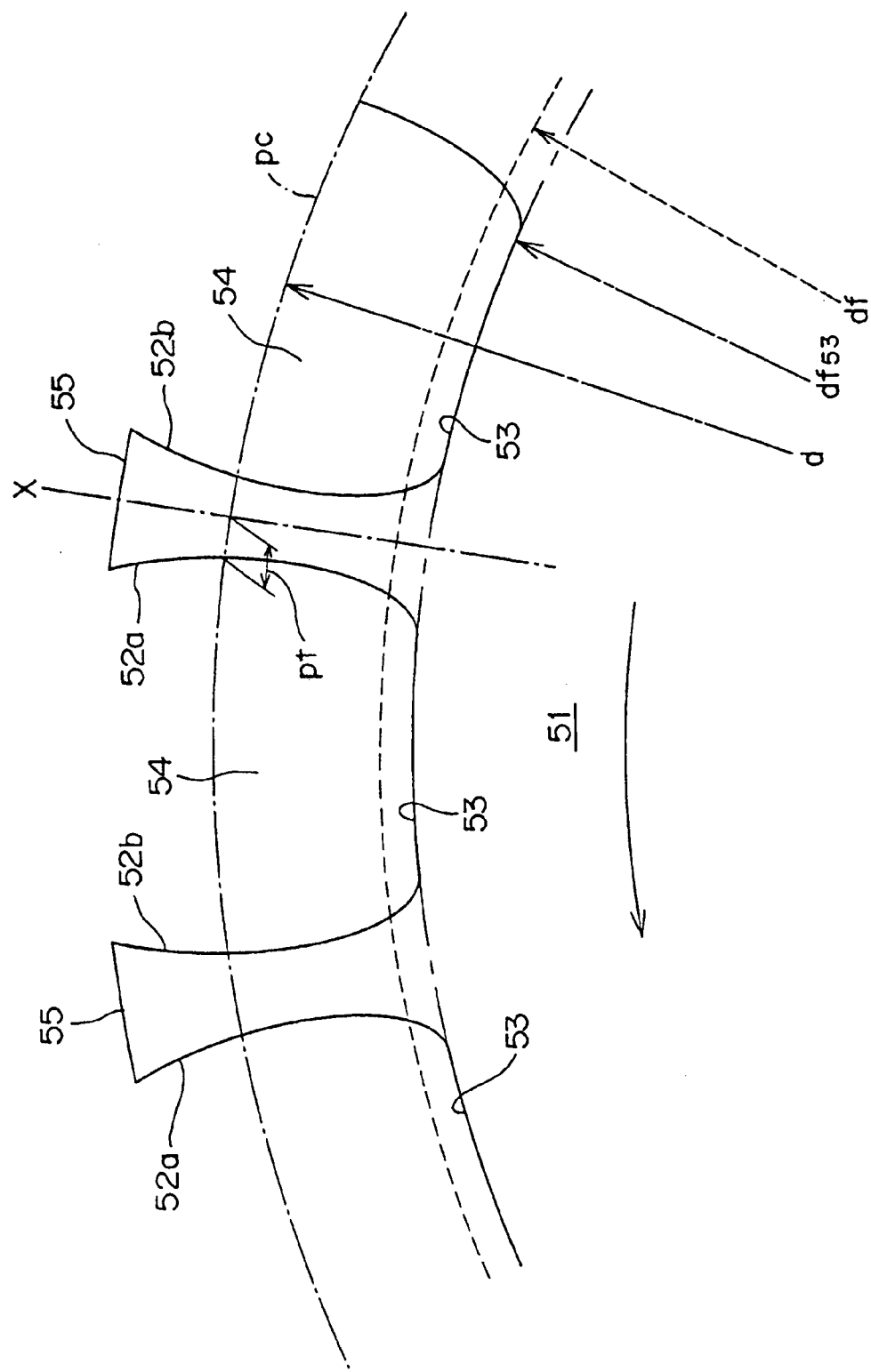
FIG. 10 is an enlarged view showing the tooth form of a driving sprocket according to a fifth embodiment of the invention.

The slat conveyor according to the fourth embodiment of the invention produces substantially the same actions and effects as those produced by the slat conveyors of the first and second embodiments In the fifth embodiment of a slat conveyor according to the invention, the driving and driven sprockets have the tooth configuration shown in FIG. 10. Since the driving and driven sprockets have the same tooth forms, only the driving sprocket 51 will be described.

Each tooth 55 has front and back tooth surfaces 52a and 52b respectively, and the teeth are separated by tooth gaps having a tooth gap bottom 53. The front tooth surfaces 52a and the back tooth surfaces 52b are both symmetrical with respect to the center lines x of the teeth 55. The configuration of the teeth 55 in FIG. 10 is similar to that of the teeth 25 in FIG. 4, with two exceptions. First, the narrowest part of the teeth 55 in FIG. 10 is radially inward from the pitch circle pc, whereas the narrowest part of the teeth 25 in FIG. 4 is at the location of the pitch circle. Second, the bottom 53 of the tooth gaps is partly convex, following the tooth bottom circle, i.e., following an arc having a radius corresponding to one-half the root diameter diameter $df_{53}$. The front and back surfaces of the teeth merge with the tooth bottoms by way of a compound curve, and, as in the previously described embodiments, the front and back surfaces 52a and 52b of the tooth are smoothly continuous with the tooth bottom.

The distances from the center line x of the tooth 55 to the front tooth surface 52a and to the back tooth surface 52b, at locations radially outward from the pitch circle, are greater than the distance pt, measured from the intersection of the pitch circle with the center line x to the intersection of the pitch circle with the front tooth surface 52a. As shown in FIG. 10, the root diameter $df_{53}$ is smaller than the root diameter df of the ISO tooth form. That is the relation $df_{53}<df$ is satisfied, taking ISO tolerances into account. For the purpose of comparison, the root diameter df for the ISO tooth form is shown by a broken line in FIG. 10.

The slat conveyor according to the second embodiment of the invention produces substantially the same actions and effects as those produced by slat conveyor of the first embodiment, explained above with reference to FIGS. 3, 5 and 6.

As will be apparent from the preceding description, in each of the described embodiments, the tooth form of each sprocket tooth has a portion at which the distance from the center line of the tooth to at least the front tooth surface in the rotational direction of the sprocket, at a location radially outward from the pitch circle, is larger than or equal to the distance from the center line of the tooth at the location of the pitch circle to the intersection of the pitch circle and the front tooth surface.

In the above-described examples of the invention, making the root diameters of the driving and driven sprockets smaller than the root diameters according to the ISO tooth form is effective where tension does not act on the slack side of the chain. However, the root diameters do not need to be less than the root diameters of the ISO tooth form, in a driving system in which tension acts on the slack side of a roller chain.

As mentioned previously, although the chains in the conveying system of the invention are preferably roller chains, the advantages of the invention may be realized in an conveying system utilizing bushing-type chains. Furthermore, while the invention is particularly advantageous when used in a slat conveyor, the invention may be applied to other conveyance systems, for example, an escalator and the like.

TABLE 1

Tolerance limits for root diameter

| Root diameter, $d_f$ mm | Upper deviation | Lower deviation |
| --- | --- | --- |
| $d_f \leqq 127$ | 0 | 0.25 mm |
| $127 < d_f \leqq 250$ | 0 | 0.3 mm |
| $d_f > 250$ | 0 | h11[1)] |

[1)]See ISO 286-2.

TABLE 2

Limit deviations for shafts h

Upper limit deviation = es

Lower limit deviation = ei

| Basic size mm | | h | | | | | | | | | | | | | | | | | |
| --- | --- | --- | --- | --- | --- | --- | --- | --- | --- | --- | --- | --- | --- | --- | --- | --- | --- | --- | --- |
| | | 1 | 2 | 3 | 4 | 5 | 6 | 7 | 8 | 9 | 10 | 11 | 12 | 13 | 14[1)] | 15[1)] | 16[1)] | 17 | 18 |
| Above | Up to and including | Deviations | | | | | | | | | | | | | | | | | |
| | | μm | | | | | | | | | | | mm | | | | | | |
| — | 3[1)] | 0 −0.8 | 0 −1.2 | 0 −2 | 0 −3 | 0 −4 | 0 −6 | 0 −10 | 0 −14 | 0 −25 | 0 −40 | 0 −60 | 0 −0.1 | 0 −0.14 | 0 −0.25 | 0 −0.4 | 0 −0.6 | | |
| 3 | 6 | 0 −1 | 0 −1.5 | 0 −2.5 | 0 −4 | 0 −5 | 0 −8 | 0 −12 | 0 −18 | 0 −30 | 0 −48 | 0 −75 | 0 −0.12 | 0 −0.18 | 0 −0.3 | 0 −0.48 | 0 −0.75 | 0 −1.2 | 0 −1.8 |
| 6 | 10 | 0 −1 | 0 −1.5 | 0 −2.5 | 0 −4 | 0 −6 | 0 −9 | 0 −15 | 0 −22 | 0 −36 | 0 −58 | 0 −90 | 0 −0.15 | 0 −0.22 | 0 −0.36 | 0 −0.58 | 0 −0.9 | 0 −1.5 | 0 −2.2 |
| 10 | 18 | 0 −1.2 | 0 −2 | 0 −3 | 0 −5 | 0 −8 | 0 −11 | 0 −18 | 0 −27 | 0 −43 | 0 −70 | 0 −110 | 0 −0.18 | 0 −0.27 | 0 −0.43 | 0 −0.7 | 0 −1.1 | 0 −1.8 | 0 −2.7 |
| 18 | 30 | 0 −1.5 | 0 −2.5 | 0 −4 | 0 −6 | 0 −9 | 0 −13 | 0 −21 | 0 −33 | 0 −52 | 0 −84 | 0 −130 | 0 −0.21 | 0 −0.33 | 0 −0.52 | 0 −0.84 | 0 −1.3 | 0 −2.1 | 0 −3.3 |
| 30 | 50 | 0 −1.5 | 0 −2.5 | 0 −4 | 0 −7 | 0 −11 | 0 −16 | 0 −25 | 0 −39 | 0 −62 | 0 −100 | 0 −150 | 0 −0.25 | 0 −0.39 | 0 −0.62 | 0 −1 | 0 −1.6 | 0 −2.5 | 0 −3.9 |
| 50 | 80 | 0 −2 | 0 −3 | 0 −5 | 0 −8 | 0 −13 | 0 −19 | 0 −30 | 0 −46 | 0 −74 | 0 −120 | 0 −190 | 0 −0.3 | 0 −0.46 | 0 −0.74 | 0 −1.2 | 0 −1.9 | 0 −3 | 0 −4.6 |

TABLE 2-continued

| Over | Up to | | | | | | | | | | | | | | | | | | |
|---|---|---|---|---|---|---|---|---|---|---|---|---|---|---|---|---|---|---|---|
| 80 | 120 | 0<br>−2.5 | 0<br>−4 | 0<br>−6 | 0<br>−10 | 0<br>−15 | 0<br>−22 | 0<br>−35 | 0<br>−54 | 0<br>−87 | 0<br>−140 | 0<br>−220 | 0<br>−0.35 | 0<br>−0.54 | 0<br>−0.87 | 0<br>−1.4 | 0<br>−2.2 | 0<br>−3.5 | 0<br>−5.4 |
| 120 | 180 | 0<br>−3.5 | 0<br>−5 | 0<br>−8 | 0<br>−12 | 0<br>−18 | 0<br>−25 | 0<br>−40 | 0<br>−63 | 0<br>−100 | 0<br>−160 | 0<br>−250 | 0<br>−0.4 | 0<br>−0.63 | 0<br>−1 | 0<br>−1.6 | 0<br>−2.5 | 0<br>−4 | 0<br>−6.3 |
| 180 | 250 | 0<br>−4.5 | 0<br>−7 | 0<br>−10 | 0<br>−14 | 0<br>−20 | 0<br>−29 | 0<br>−46 | 0<br>−72 | 0<br>−115 | 0<br>−185 | 0<br>−290 | 0<br>−0.46 | 0<br>−0.72 | 0<br>−1.15 | 0<br>−1.85 | 0<br>−2.9 | 0<br>−4.6 | 0<br>−7.2 |
| 250 | 315 | 0<br>−6 | 0<br>−8 | 0<br>−12 | 0<br>−16 | 0<br>−23 | 0<br>−32 | 0<br>−52 | 0<br>−81 | 0<br>−130 | 0<br>−210 | 0<br>−320 | 0<br>−0.52 | 0<br>−0.81 | 0<br>−1.3 | 0<br>−2.1 | 0<br>−3.2 | 0<br>−5.2 | 0<br>−8.1 |
| 315 | 400 | 0<br>−7 | 0<br>−9 | 0<br>−13 | 0<br>−18 | 0<br>−25 | 0<br>−36 | 0<br>−57 | 0<br>−89 | 0<br>−140 | 0<br>−230 | 0<br>−360 | 0<br>−0.57 | 0<br>−0.89 | 0<br>−1.4 | 0<br>−2.3 | 0<br>−3.6 | 0<br>−5.7 | 0<br>−8.9 |
| 400 | 500 | 0<br>−8 | 0<br>−10 | 0<br>−15 | 0<br>−20 | 0<br>−27 | 0<br>−40 | 0<br>−63 | 0<br>−97 | 0<br>−155 | 0<br>−250 | 0<br>−400 | 0<br>−0.63 | 0<br>−0.97 | 0<br>−1.55 | 0<br>−2.5 | 0<br>−4 | 0<br>−6.3 | 0<br>−9.7 |
| 500 | 630 | 0<br>−9 | 0<br>−11 | 0<br>−16 | 0<br>−22 | 0<br>−32 | 0<br>−44 | 0<br>−70 | 0<br>−110 | 0<br>−175 | 0<br>−280 | 0<br>−440 | 0<br>−0.7 | 0<br>−1.1 | 0<br>−1.75 | 0<br>−2.8 | 0<br>−4.4 | 0<br>−7 | 0<br>−11 |
| 630 | 800 | 0<br>−10 | 0<br>−13 | 0<br>−18 | 0<br>−25 | 0<br>−36 | 0<br>−50 | 0<br>−80 | 0<br>−125 | 0<br>−200 | 0<br>−320 | 0<br>−500 | 0<br>−0.8 | 0<br>−1.25 | 0<br>−2 | 0<br>−3.2 | 0<br>−5 | 0<br>−8 | 0<br>−12.5 |
| 800 | 1000 | 0<br>−11 | 0<br>−15 | 0<br>−21 | 0<br>−28 | 0<br>−40 | 0<br>−56 | 0<br>−90 | 0<br>−140 | 0<br>−230 | 0<br>−360 | 0<br>−560 | 0<br>−0.9 | 0<br>−1.4 | 0<br>−2.3 | 0<br>−3.6 | 0<br>−5.6 | 0<br>−9 | 0<br>−14 |
| 1000 | 1250 | 0<br>−13 | 0<br>−18 | 0<br>−24 | 0<br>−33 | 0<br>−47 | 0<br>−66 | 0<br>−105 | 0<br>−165 | 0<br>−260 | 0<br>−420 | 0<br>−660 | 0<br>−1.05 | 0<br>−1.65 | 0<br>−2.6 | 0<br>−4.2 | 0<br>−6.6 | 0<br>−10.5 | 0<br>−16.5 |
| 1250 | 1600 | 0<br>−15 | 0<br>−21 | 0<br>−29 | 0<br>−39 | 0<br>−55 | 0<br>−78 | 0<br>−125 | 0<br>−195 | 0<br>−310 | 0<br>−500 | 0<br>−780 | 0<br>−1.25 | 0<br>−1.95 | 0<br>−3.1 | 0<br>−5 | 0<br>−7.8 | 0<br>−12.5 | 0<br>−19.5 |
| 1600 | 2000 | 0<br>−18 | 0<br>−25 | 0<br>−35 | 0<br>−46 | 0<br>−65 | 0<br>−92 | 0<br>−150 | 0<br>−230 | 0<br>−370 | 0<br>−600 | 0<br>−920 | 0<br>−1.5 | 0<br>−2.3 | 0<br>−3.7 | 0<br>−6 | 0<br>−9.2 | 0<br>−15 | 0<br>−23 |
| 2000 | 2500 | 0<br>−22 | 0<br>−30 | 0<br>−41 | 0<br>−55 | 0<br>−78 | 0<br>−110 | 0<br>−175 | 0<br>−280 | 0<br>−440 | 0<br>−700 | 0<br>−1100 | 0<br>−1.75 | 0<br>−2.8 | 0<br>−4.4 | 0<br>−7 | 0<br>−11 | 0<br>−17.5 | 0<br>−28 |
| 2500 | 3150 | 0<br>−26 | 0<br>−36 | 0<br>−50 | 0<br>−68 | 0<br>−96 | 0<br>−135 | 0<br>−210 | 0<br>−330 | 0<br>−540 | 0<br>−860 | 0<br>−1350 | 0<br>−2.1 | 0<br>−3.3 | 0<br>−5.4 | 0<br>−8.6 | 0<br>−13.5 | 0<br>−21 | 0<br>−33 |

[1] Tolerance grades IT14 to IT16 (incl.) shall not be used for basic sizes less than or equal to 1 mm.
[2] The values given in the frame, for tolerance grades IT1 to IT5 (incl.), for basic sizes greater than 500 mm and less than or equal to 3,150 mm, are included for experimental use.

We claim:

1. A conveyance system comprising a pair of endless conveyor chains arranged in spaced, side-by-side, relationship along a conveying path having a first end and a second end, a pair of driving sprockets respectively in meshing engagement with the chains at said first end, and rotatable in a direction to drive said chains in a first direction along said conveying path, and a pair of driven sprockets, respectively in meshing engagement with the chains at said second end, and rotatable by said chains; wherein said chains are roller chains having rollers as sprocket-engaging members, or bushing chains having bushings as sprocket-engaging members, said bushings or rollers each having a uniform diameter;

each of said sprockets has a plurality of teeth, with tooth gaps between successive teeth, and a pitch circle;

the successive teeth of each sprocket have facing tooth surfaces which are continuous with, and connected to each other by, a gap bottom;

the sprocket engaging members of each of the chains are engageable with the gap bottoms in the tooth gaps of the respective driving and driven sprockets of the conveyance system;

the tooth form of each tooth of each of said sprockets has a front tooth surface and a rear tooth surface, the front tooth surface preceding the rear tooth surface in the direction of rotation of the sprocket, and the tooth form of each tooth of each of said sprockets has a portion at which the distance from the center line of the tooth to at least the front tooth surface of the same tooth, at a location radially outward from the pitch circle, is larger than or equal to the distance from the center line at the location of said pitch circle to the intersection of said pitch circle and said front tooth surface;

each of said driving sprockets and said driven sprockets has a root diameter defined as the diameter of a circle tangent to the gap bottoms of the sprocket, and in which said root diameter is less than the difference between the diameter of said pitch circle and said uniform diameter of the bushings or rollers, less the lower deviation set forth in Tables 1 and 2.

* * * * *

UNITED STATES PATENT AND TRADEMARK OFFICE
CERTIFICATE OF CORRECTION

PATENT NO. : 7,442,139 B2
APPLICATION NO. : 11/247625
DATED : October 28, 2008
INVENTOR(S) : Aizoh Kubo, Hiroki Ishida and Masatoshi Sonoda It is certified that error appears in the above-identified patent and that said Letters Patent is hereby corrected as shown below:

In Table 2, in the sixth line of column 11, "-150" should read -- -160 --

Signed and Sealed this

Thirtieth Day of December, 2008

JON W. DUDAS
*Director of the United States Patent and Trademark Office*